(12) United States Patent
Mitchell, Jr.

(10) Patent No.: US 6,608,002 B1
(45) Date of Patent: Aug. 19, 2003

(54) DIRECT THERMAL PRINTABLE FILM WITH FRICTION-REDUCING LAYER

(75) Inventor: Chauncey T. Mitchell, Jr., Lakeland, TN (US)

(73) Assignee: Media Solutions International, Inc., Wausau, WI (US)

( * ) Notice: Subject to any disclaimer, the term of this patent is extended or adjusted under 35 U.S.C. 154(b) by 575 days.

(21) Appl. No.: 09/639,646

(22) Filed: Aug. 16, 2000

Related U.S. Application Data

(62) Division of application No. 08/935,322, filed on Sep. 22, 1997, now Pat. No. 6,124,236.
(60) Provisional application No. 60/026,501, filed on Sep. 23, 1996.

(51) Int. Cl.[7] .................................................. B41M 5/40
(52) U.S. Cl. ........................ 503/201; 503/200; 503/226; 156/235
(58) Field of Search ............................... 503/200, 226, 503/201; 156/235

(56) References Cited

U.S. PATENT DOCUMENTS

| | | | |
|---|---|---|---|
| 3,080,254 A | 3/1963 | Grant, Jr. .................... 117/36.8 |
| 4,273,602 A | 6/1981 | Kosaka et al. ............... 156/234 |
| 4,370,370 A | 1/1983 | Iwata et al. .................... 428/40 |
| 4,551,738 A | 11/1985 | Maruta et al. ............... 346/200 |
| 4,570,169 A | 2/1986 | Kasamatsu et al. ......... 346/200 |
| 4,577,204 A | 3/1986 | Shibata et al. ............... 346/200 |
| 4,633,276 A | 12/1986 | Shibata et al. ............... 346/200 |
| 4,641,159 A | 2/1987 | Seitz et al. .................. 346/200 |
| 4,675,705 A | 6/1987 | Marginean et al. ......... 503/209 |
| 4,711,874 A | 12/1987 | Yuyama et al. ............. 503/206 |
| 4,717,709 A | 1/1988 | Suzuki ........................ 503/200 |
| 4,851,383 A | 7/1989 | Fichenscher et al. ....... 503/200 |
| 4,886,774 A | 12/1989 | Doi ............................. 503/226 |
| 4,892,602 A | 1/1990 | Oike et al. ................... 156/233 |
| 4,898,848 A | 2/1990 | Shibata ....................... 503/200 |
| 4,898,849 A | 2/1990 | Kang .......................... 503/214 |
| 4,927,801 A | 5/1990 | Mahmud ..................... 503/200 |
| 5,023,227 A | 6/1991 | Matoba et al. .............. 503/214 |
| 5,075,369 A | 12/1991 | Mahmud ..................... 524/475 |
| 5,079,212 A | 1/1992 | Ishida et al. ................. 503/226 |
| 5,141,914 A | 8/1992 | Kang .......................... 503/226 |
| 5,151,403 A | 9/1992 | Suzuki et al. ............... 503/200 |
| 5,219,821 A | 6/1993 | Arbee et al. ................. 503/226 |
| 5,273,808 A | 12/1993 | Mano et al. ................. 428/195 |
| 5,286,703 A | 2/1994 | Wachi et al. ................ 503/211 |
| 5,296,440 A | 3/1994 | Kanda et al. ................ 503/208 |
| 5,424,182 A | 6/1995 | Marginean, Sr. et al. ... 430/617 |
| 5,432,534 A | 7/1995 | Maruyama et al. ......... 347/172 |
| 5,472,930 A | 12/1995 | Podszun et al. ............. 503/214 |
| 5,658,661 A | 8/1997 | Mitchell, Jr. et al. ....... 428/352 |
| RE35,640 E | 10/1997 | Hotta et al. ................. 503/200 |
| 5,753,587 A | 5/1998 | Podszun et al. ............. 503/210 |
| 5,773,386 A | 6/1998 | Langan ....................... 503/226 |
| 6,090,747 A | 7/2000 | Dronzek ...................... 503/201 |

FOREIGN PATENT DOCUMENTS

| | | |
|---|---|---|
| JP | 63-236683 | 10/1988 |
| WO | US/95/31800 | 11/1995 |

*Primary Examiner*—B. Hamilton Hess
(74) *Attorney, Agent, or Firm*—Eugene Stephens & Associates; Thomas B. Ryan

(57) ABSTRACT

A new direct thermal printable media includes an optically transmissive film that gives both form and protection to a layer of thermosensitive imaging material on a back surface of the film. Concentrations of heat applied to a front surface of the film form images within the thermosensitive layer that are visible through the film. A substrate is laminated to the thermosensitive layer on the back surface of the film for providing additional support independently of physical and chemical properties required for directly supporting thermosensitive imaging material.

11 Claims, 4 Drawing Sheets

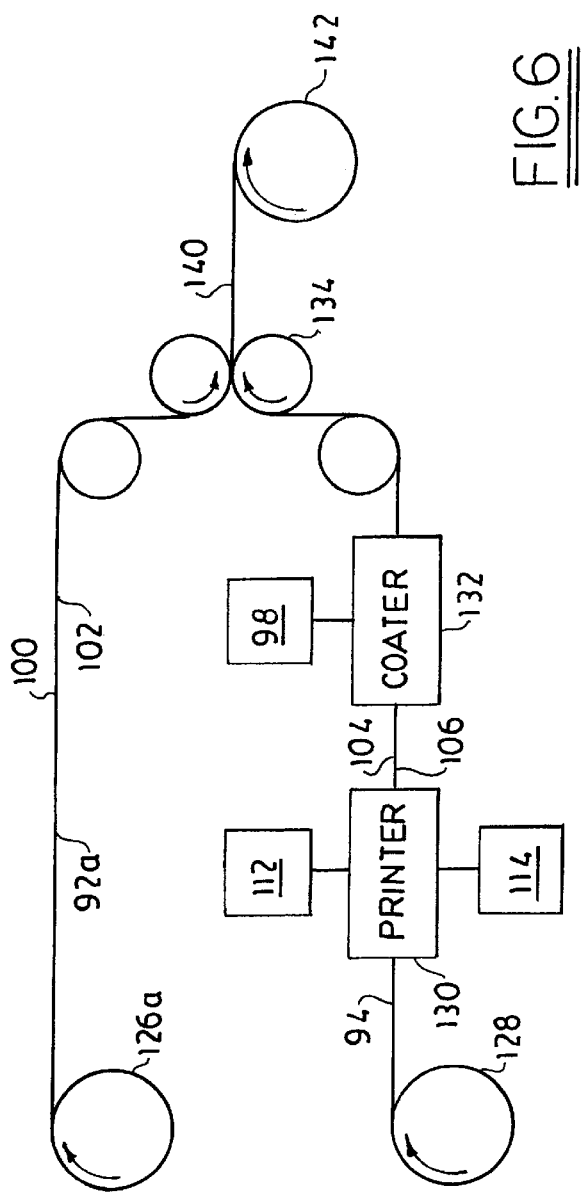
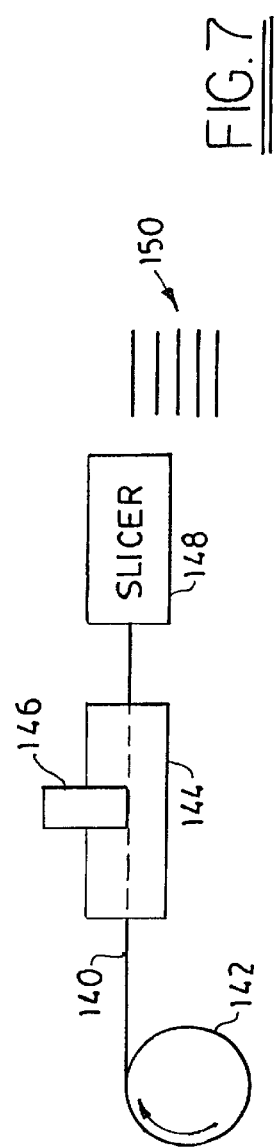

DIRECT THERMAL PRINTABLE FILM WITH FRICTION-REDUCING LAYER

RELATED APPLICATIONS

This application is a Division of copending allowed parent application No. 08/935,322, filed Sep. 22, 1997, now U.S. Pat. No. 6,124,236 by Chauncey T. Mitchell, Jr., entitled DIRECT THERMAL PRINTABLE FILM AND LAMINATE, which parent application claims the benefit of Provisional Application No. 60/026,501, filed Sep. 23, 1996. Both the parent application and the Provisional application are hereby incorporated by reference.

TECHNICAL FIELD

The invention relates to the field of direct thermal printing and especially to media used for such printing.

BACKGROUND

Direct thermal printable media is most widely used as facsimile paper but is also used in printers and in other applications requiring permanent imaging such as tags, tickets, and labels. In contrast to printing technologies that involve the transfer of ink from one location to another, direct thermal printing uses a special printable media that incorporates a color developing mechanism. Images are formed by exposing the color developing mechanism to concentrations of heat that produce localized chemical reactions involving a change of color (usually light to dark). The color developing mechanism is provided by a thermosensitive imaging material containing heat reactive chemicals such as leuco dyes or metallic salts.

Since direct thermal printing only involves the transfer of heat, printing of direct thermal media is simple and clean. Other advantages include low cost, low noise, and high speed. However, the thermosensitive imaging material is susceptible to damage from exposure to various environmental conditions including abrasion, heat, light, and chemicals such as oils, fats, blood, alcohol, solvent, and water. Much of this damage can be limited by applying protective coatings that block unwanted environmental interactions with the thermosensitive imaging material.

For example, U.S. Pat. No. 4,711,874 to Yuyama et al. suggests use of a water-soluble polymeric material as a protective overcoating for providing physical and chemical resistance. U.S. Pat. No. 4,717,709 to Suzuki suggests use of a polyolefin resin for similar purposes. U.S. Pat. No. 4,886,774 to Doi discloses a protective overcoating containing UV blockers. U.S. Pat. No. 5,286,703 to Wachi et al. discloses use of multiple protective overcoat layers including a first layer of water-soluble or water-insoluble polymers for chemical resistance and a second layer containing UV blockers.

The thermosensitive imaging material is applied as a coating to a substrate surface. Printing takes place by exposing the coating to a pattern of heat conducted from a thermal print head located adjacent to the substrate surface containing the coating of thermosensitive imaging material. The coating takes the form of the substrate surface including any irregularities or roughness in the surface. Accordingly, any surface irregularities in the thermosensitive coating vary spacing between the thermal print head and different points on the coating, causing unwanted dissipations of heat that interfere with image quality.

Two solutions are known to limit irregularities in the thermosensitive coating. One is to use only substrates with smooth surfaces. The other is to apply an undercoating between the substrate and the thermosensitive coating. The undercoating covers irregularities in the substrate surface and provides a smooth base for applying the thermosensitive coating. An example is found in U.S. Pat. No. 4,711,874 to Yuyama et al.

Protective overcoatings shield thermosensitive coatings from environmental interactions, and undercoatings provide a smooth base for applying thermosensitive coatings; but both add cost and complexity to direct thermal printable media. Also, the undercoatings can change the appearance or other desired properties of the substrates. However, without an undercoating, the choice of substrate is even more limited.

SUMMARY OF INVENTION

My invention obviates the need for both overcoatings and undercoatings that separately protect and support coatings of thermosensitive imaging material in direct thermal printable media. Coatings of thermosensitive imaging material can be used with a wider variety of underlying substrates without resort to undercoatings, because surface features of the thermosensitive coating are no longer linked to the surface features of the underlying substrates.

An example of my invention as a direct thermal printable laminate includes two adjacent substrates, one of which is preferably an optically and thermally transmissive film. A thermosensitive imaging layer is located adjacent to a back surface of the transmissive film, and the back surface of the transmissive film is bonded to a front surface of the other substrate for laminating the transmissive film to the other substrate. The thermosensitive imaging layer is reactive to transmissions of heat through the film (which is thermally transmissive) for forming images within the thermosensitive imaging layer that are visible through the same film (which is also optically transmissive).

Preferably, the thermosensitive imaging layer is bonded directly to the back surface of the film and indirectly to the front surface of the other substrate through the intermediacy of an adhesive layer. Accordingly, the thermosensitive imaging layer takes the form of the back surface of the film rather than the form of the front surface of the other substrate.

In addition to functioning as a transmitter of both light and heat, the film can perform two other main functions—first, as a protective covering for the thermosensitive imaging layer and second, as a base for giving desired form to the thermosensitive imaging material. Thus, my invention permits many more materials to be used as substrates for direct thermal printing while protecting the thermosensitive imaging layer from unwanted environmental interactions.

My new laminate is printable by applying concentrations of heat from a thermal print head to the front surface of the film resulting in the formation of images within the thermosensitive imaging layer. The film is preferably much thinner in thickness than the other substrate to more efficiently transmit heat from the thermal print head to the thermosensitive imaging layer. Thicknesses less than 10 microns are preferred.

Another example of my invention as self-wound direct thermal printable tape includes a similarly transmissive film. A release layer is applied to a front surface of the film, and a thermosensitive imaging layer is applied to a back surface of the film. The thermosensitive imaging layer is reactive to transmissions of heat through the film for forming images within the thermosensitive, imaging layer. Adhesive layers are applied to front and back surfaces of a substrate. A first of the adhesive layers bonds the substrate to the film, and a second of the adhesive layers is intended for bonding the film and substrate to another substrate or object. However, prior to bonding the film and substrate to another substrate or object, the film and substrate are unwindable from a roll in which the second adhesive layer is in contact with the release layer.

Again, a wider selection of substrates can be used with my new direct thermal printable tape, because the transmissive film provides the thermosensitive imaging layer with a desired form as well as a protective covering against exposure to environmental hazards. The release layer on the front surface of the film eliminates any need for a separate release liner to protect the second adhesive layer prior to use. Also, since the thermosensitive imaging material is first coated on the film rather than on the underlying substrate, smaller production runs are more economical because the coated film can be divided for runs with different substrates.

In fact, a thin thermally transmissive film coated with a thermosensitive imaging material in accordance with my invention can be made as either an intermediate product intended for lamination to another substrate or as a final product that can be imaged prior to or in conjunction with its use. Preferably, the film is both thermally and optically transmissive and has a thickness no greater than 10 microns.

DRAWINGS

FIG. 6 is a diagram of a production line for coating a substrate and for laminating the coated film to the coated substrate.

FIG. 7 is a diagram of a printing sequence for direct thermal printing of the new laminate.

DETAILED DESCRIPTION

Figure 1:
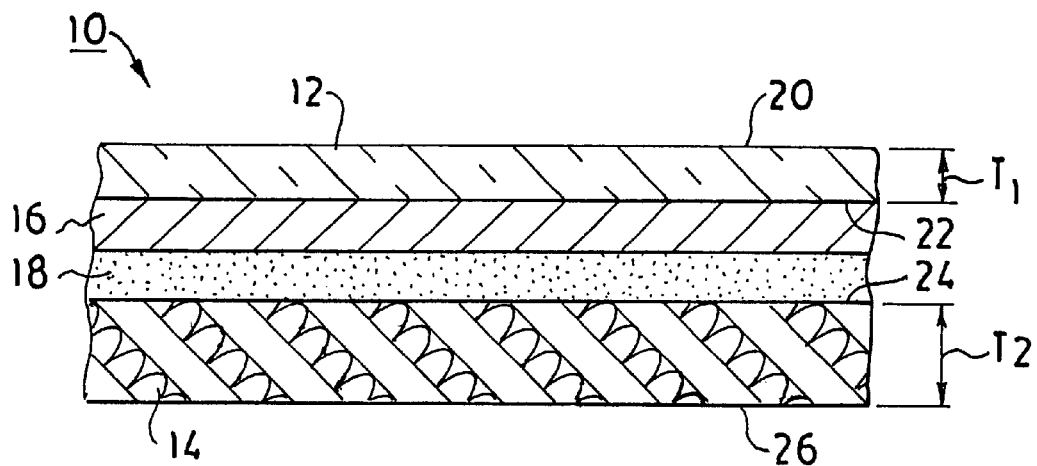
FIG. 1 is a schematic cross section of a first embodiment of my invention as a new direct thermal printable laminate.

Illustrated by FIG. 1 is a direct thermal printable laminate 10 having two adjacent substrates 12 and 14 joined by a layer 16 of thermosensitive imaging material and by a layer 18 of adhesive. The layer 16 of thermosensitive imaging material is bonded to the substrate 12, and the two substrates 12 and 14 are bonded to each other by the adhesive layer 18. Concentrations of heat from a thermal print head (not shown until FIG. 7) can be applied to the first substrate 12 for forming images in the layer 16 of thermosensitive imaging material.

The substrate 12, which is preferably an optically and thermally transmissive film, has thickness "$T_1$" measured between front and back surfaces 20 and 22. The thickness "$T_1$" is preferably limited to 10 microns or less (e.g., 6 microns) to avoid interfering with transmissions of heat through the film 12 required for forming images within the thermosensitive imaging layer 16. The images so formed are visible through the film 12. Preferably, the film 12 is made from a strip of flexible material such as polyester, which is capable of making the required transmissions of light and heat as well as capable of retaining its form at the required thickness "$T_1$". Other possible film materials include polyethylene, polypropylene, acetate, or other polyolefins.

Various coatings (not shown) can be applied to the film 12 to provide additional protection for the thermosensitive imaging layer 16 from Sep. 17, 1992 exposure to potentially damaging environmental conditions. For example, the film 12 can be coated with UV blockers as described in U.S. Pat. No. 4,886,774 to Doi, which is hereby incorporated by reference.

The thermosensitive imaging layer 16 preferably contains a dye precursor such as a pale or colorless leuco dye and a color former such as an acidic developer that causes the leuco dye to undergo a color transformation in the presence of heat. The dye precursor and color former are separately microencapsulated or otherwise separated to prevent their interaction prior to the application of a predetermined amount of heat. Other color developing mechanisms could also be used including metallic salt color former chemical systems.

The substrate 14 can be selected from a wider variety of materials including those that do not have physical and chemical properties required for directly supporting thermosensitive imaging material. Examples include high-ground wood content paper, high-strength films such as polyvinyl plastics, and woven or non-woven fabrics, as well as other coarse materials that would otherwise not be suitable for direct thermal printing. Front and back surfaces 24 and 26 of the substrate 14 are separated by a thickness "$T_2$" that can be much greater than the thickness "$T_1$". For example, the thickness "$T_2$" can exceed the thickness "$T_1$" by an order of magnitude or more.

Preferably, the layer 16 of thermosensitive imaging material is applied as a coating that takes the form of the back surface 22 of the film 12. Accordingly, the back surface 22 of the film must be smooth for mounting the layer 16 of thermosensitive imaging material at a constant distance from a print head. However, the front surface 24 of the substrate 14 can be much rougher. For example, the front surface 24 of the substrate can have an average peak-to-valley roughness that is larger than an average peak-to-valley roughness of the back surface 22 of the film. In fact, the peak-to-valley roughness of the front surface 24 can exceed an average thickness of the thermosensitive imaging layer 16 while the similarly measured roughness of the back surface 22 is preferably much less.

The adhesive layer 18 can be applied as a coating on the front surface 24 of the substrate 14. Preferably, the adhesive layer 18 is formed by a pressure-sensitive adhesive to form a permanent bond with the film 12. If mutually compatible, the adhesive layer 18 can be bonded directly in contact with the thermosensitive imaging layer 16. Possible examples include acrylics, water-borne adhesives, hot melts, and rubber-based extrusions.

Figure 2:
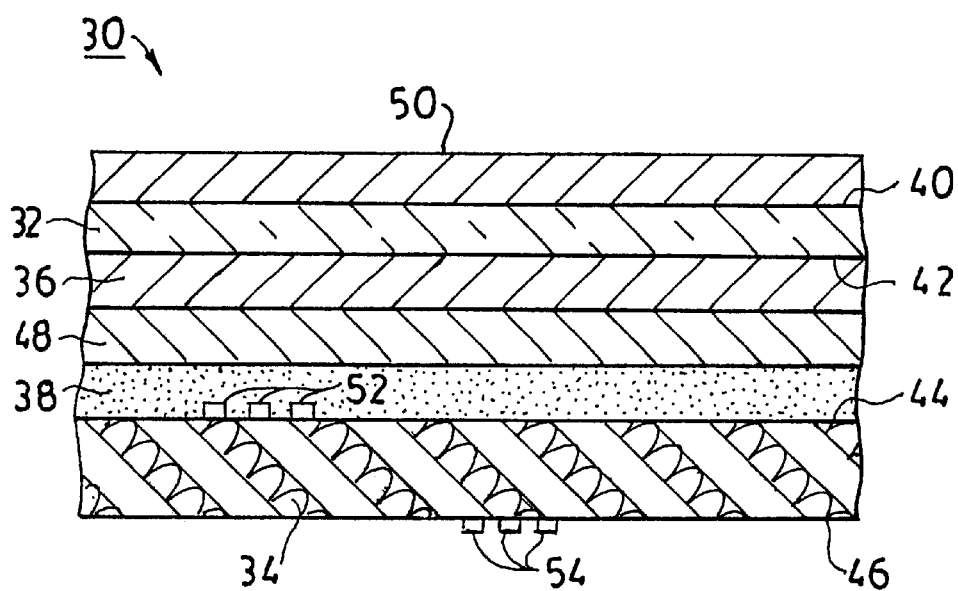
FIG. 2 is a schematic cross section of a second embodiment of my invention as a similar laminate having additional layers.

A direct thermal laminate 30 shown in FIG. 2 includes additional layers for performing specialized functions. Similar to the preceding laminate 10, the laminate 30 includes an optically and thermally transmissive film 32 and a substrate 34. The film 32 has front and back surfaces 40 and 42, and the substrate 34 has front and back surfaces 44 and 46. Layer 36 of thermosensitive imaging material is located adjacent to the back surface 42 of the film 32. Layer 38 of adhesive is located adjacent to the front surface 44 of the substrate 34.

However, between the thermosensitive layer 36 and the adhesive layer 38 is a barrier layer 48 that prevents migration of contaminants from the adhesive layer 38 to the thermosensitive layer 36. This permits a wider range of materials to be used in the adhesive layer 38. Suitable barrier materials include water-borne or UV curable varnishes or primers.

The thermosensitive layer 36 is preferably bonded directly to the back surface 42 of the film 32 and is bonded indirectly to the front surface 44 of the substrate 34 through the intermediacy of the adhesive layer 38. Any layers located between the thermosensitive layer 36 and the adhesive layer 38, such as the barrier layer 48, are preferably bonded in succession to the thermosensitive layer 36 so that the adhesive layer 38 provides the final connection between the film 32 and the substrate 34.

A friction-reducing coating 50, such as silicone or poly (tetrafluororthene), can be applied to the front surface 40 of the film 32 to protect thermal print heads from excessive wear. This permits a wider range of materials to be used as the film 32. A suitable coating that also functions to clean the thermal print heads is disclosed in my recently issued U.S. Pat. No. 5,658,661 entitled "Matted Release Coat for Self-wound Thermal Printable Facestock", which is hereby incorporated by reference. The front surface 40 can also be matted or otherwise made receptive to conventional printing inks. In addition, printing inks 52 and 54 can be applied to the front and back surfaces 44 and 46 of the substrate 34. The printing ink 52 is visible through the film 32.

Figure 3:
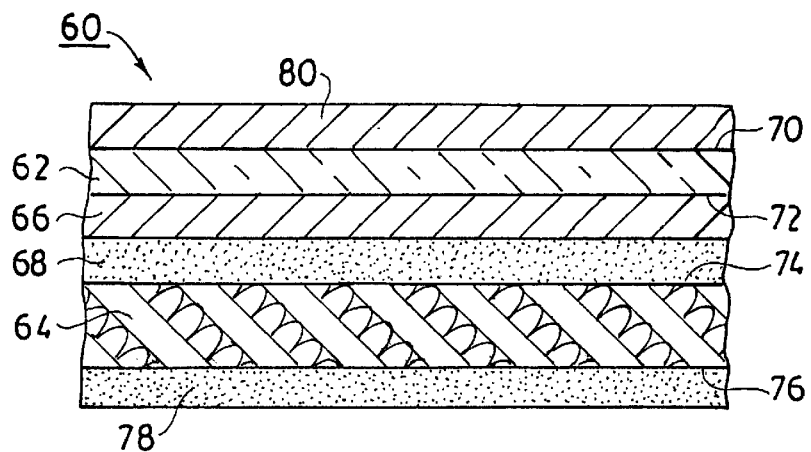
FIG. 3 is a schematic cross section of a third embodiment of my invention as a new direct thermal printable tape.
Figure 4:
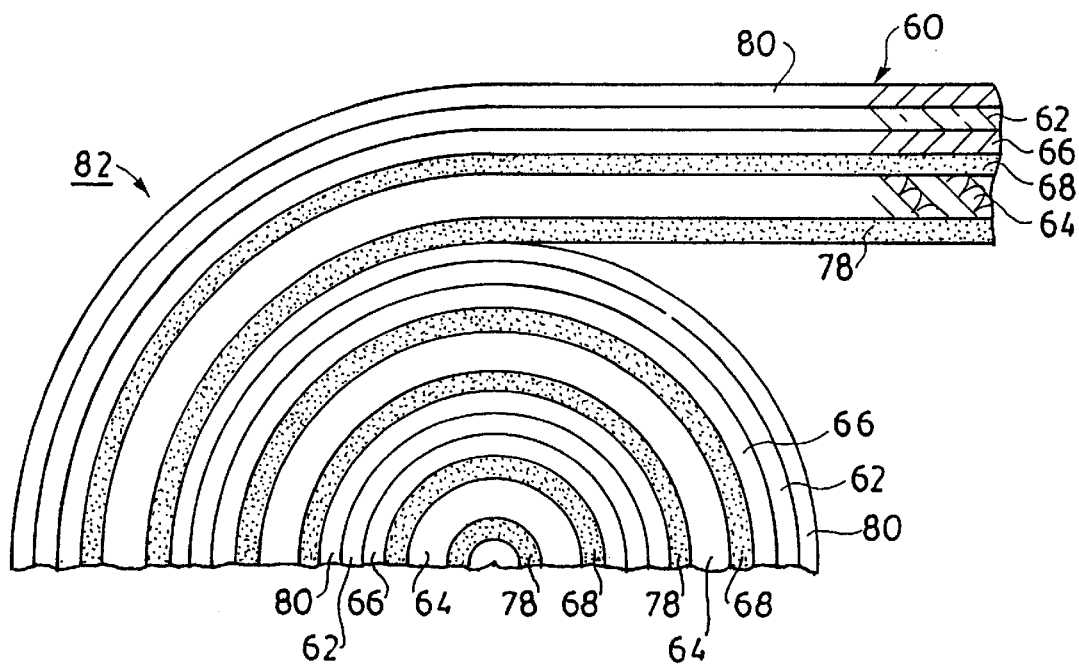
FIG. 4 is a schematic cross section of the third embodiment wound into a roll.

My invention arranged as a direct thermal printable tape 60 is illustrated by FIGS. 3 and 4. The tape 60 has a laminate construction similar to the preceding embodiments 10 and 30 but is also arranged for being affixed to another substrate or object (not shown).

A film 62 and a substrate 64 give form to the tape 60 and to various layers applied to them. A release layer 80 is applied to a front surface 70 of the film 62, and a thermosensitive imaging layer 66 is applied to a back surface 72 of the film 62. Adhesive layers 68 and 78 are applied to front and back surfaces 74 and 76 of the substrate 64. The adhesive layer 68 is in contact with the thermosensitive layer 66 for bonding the film 62 and the substrate 64 together.

The adhesive layer 78 provides for attaching the tape 60 to another substrate or object. The composition and pattern of the adhesive layer 78 are adjusted to meet the requirements of its use. Ordinarily, the adhesive layer 78 is expected to be pressure sensitive, but the adhesive layer 78 could also exhibit other qualities such as co-adhesion, repositionability, removability, and resistance to cold.

A release layer 80 protects the adhesive layer 78 prior to use. The composition of the release layer 80 is tied to the composition of the adhesive layer 78 so that the release layer 80 exhibits low adhesion to the adhesive layer 78. Liquid-curable silicone generally works well as a release coat. The release layer is preferably applied with a matted finish to prevent the accumulation of debris on the print head. An example of such a finish is disclosed in my above-identified U.S. Pat. No. 5,658,661.

When wound together into a roll 82 as shown in FIG. 4, the adhesive layer 78 on the back surface 76 of the substrate 64 contacts the release layer 80 on the front surface 70 of the film 62. The film 62 and substrate 64 can be unwound together from the roll 82 by separating the layers of adhesive and release 78 and 80.

The film 62 is ordinarily transparent (or at least translucent) to provide an optical path for viewing the images produced in the thermosensitive layer 66, and the substrate 64 is ordinarily opaque to provide a background for the images. However, the substrate 64, like the film 62, could be made optically transmissive for substituting other backgrounds. For example, the other substrates or objects to which the tape 60 is attached could be visible through both the film 62 and the substrate 64.

Alternatively, any one of the films 12, 32, or 62 in the preceding embodiments could be made opaque in combination with making their corresponding substrates 14, 34, or 64 transparent, thereby requiring images in the corresponding thermosensitive layers 16, 36, and 66 to be viewed in reverse through the substrates 14, 34, or 64. The films 12, 32, or 62 could also be made opaque to visible light but used in combination with a thermosensitive material that is infrared readable through the films. Thus, the thermosensitive imaging material can be viewed (or read) through either the films 12, 32, or 62 or their corresponding substrates 14, 34, or 64 but is preferably imaged by transmissions of heat through the films 12, 32, or 64 alone.

Figure 5:
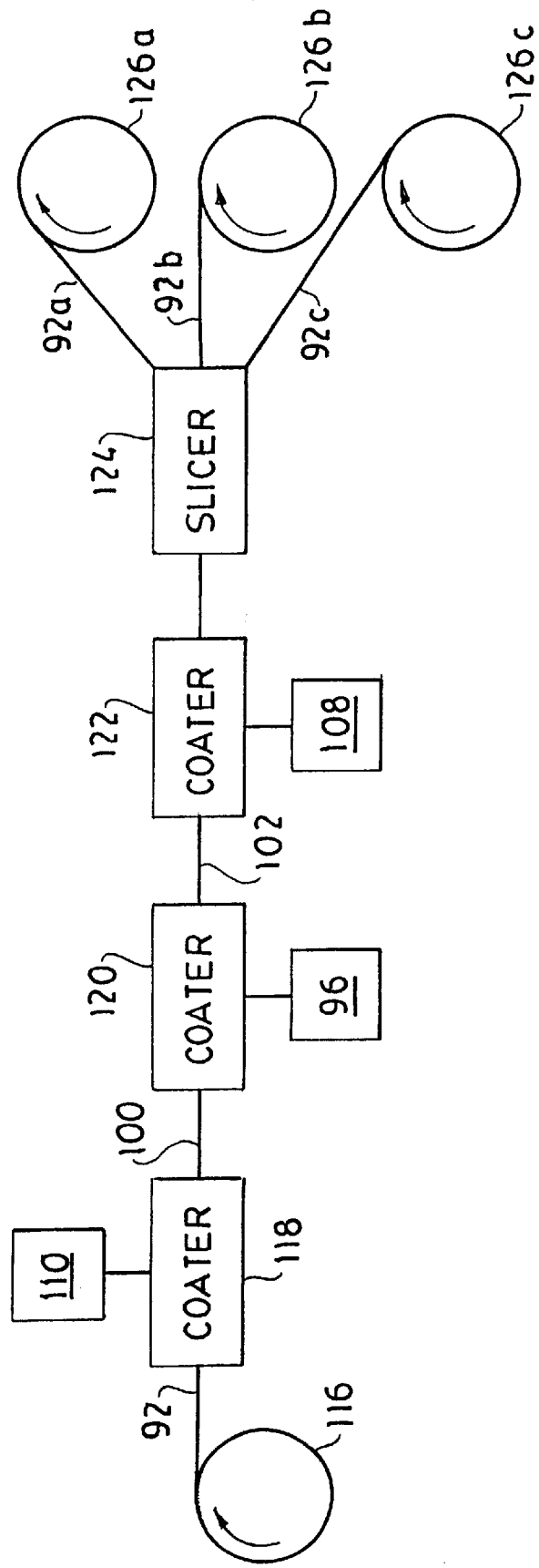
FIG. 5 is a diagram of a production line for coating thermosensitive imaging material on a thin film.

My new laminates 10, 30, and 60 can be made by a single in-line process or by a series of separate processes involving various steps of coating, printing, and laminating. For example, FIG. 5 illustrates an in-line process for separately preparing a film 92 similar to the films 12, 32, and 62 of the preceding embodiments. The film 92 is unwound from a roll 116 and is fed through a series of coaters 118, 120, and 122. The coater 118 applies a layer of friction-reducing material 110 to a front surface 100 of the film 92. The coater 120 applies a layer of thermosensitive imaging material 96 to a back surface 102 of the film 92. After curing, the coater 122 applies a layer of barrier material 108 over the layer of thermosensitive imaging material 96. The coated film 92 is then fed through a longitudinal slicer 124 that divides the coated film 92 into narrower strips 92a, 92b, and 92c, which are wound onto rolls 126a, 126b, and 126c. Each of the rolls 126a, 126b, and 126c is an intermediate product that can be combined with a number of different substrates.

In FIG. 6, the separate roll 126a is unwound together with a roll 128 of a substrate 94 similar to the substrates 14, 34, and 64. The substrate 94 is fed through a printer 130 for applying ink 112 and 114 to front and back surfaces 104 and 106 of the substrate 94 and through a coater 132 for applying an layer of adhesive 98 to the front surface 104. The printer 130 can be a thermal or a nonthermal printer. A laminator 134 joins the back surface 102 of film 92a containing the successive layers of thermosensitive imaging material 96 and barrier material 108 to the front surface 104 of the substrate 94 containing the layer of adhesive 98 creating a new direct thermal printable laminate 140. The new laminate 140 is wound into a roll 142 ready for direct thermal printing.

The coating stations can be used in different combinations, and additional coating stations can be used to apply other layers to the film 92 or substrate 94. For example, the layer of friction-reducing material 110 on the front surface 100 of the film 92 could be fashioned as a release, and another layer of adhesive could be applied to the back surface 106 of the substrate 94 for making a self-wound tape. With the friction-reducing material 110 functioning as a release, the layer of adhesive material 98 could alternatively be applied over the layer of barrier material 108 on the back surface 102 of the film 92 before winding the film 92 onto separate rolls 126a, 126b, and 126c. Separate steps could also be used to prepare the substrate 94 before unwinding from the roll 128 (such as adding perforations), or more steps could be performed on the film 92a and the substrate 94 in parallel.

A method of printing the new laminate 140 is shown in FIG. 7. The laminate 140 joining the film 92a and the substrate 94 is unwound from the roll 142 and is fed into a thermal printer 144 having a thermal print head 146. The thermal print head 146 applies heat to the front surface 100 of the film 92a for producing images within the layer of thermosensitive imaging material 96. The layer of friction-reducing material (or release) 110 on the front surface 100 of the film 92a protects the thermal print head 146 from excessive wear. A lateral slicer 148 divides the laminate 140 into individual sheets 150 according to their purpose (e.g., tag, ticket, or label). Alternatively, the laminate 140 could be perforated or aligned with a tear bar for manually separating the laminate into the individual sheets 150. The laminate 140 could also be sliced into sheets 150 prior to printing.

In addition, lamination could take place in the printer 144. For example, the film 92a and substrate 94 could be separately fed into the printer 144; and either prior to or after imaging the thermosensitive imaging material 96, the film 92a and the substrate 94 could be laminated together. This would enable direct thermal printing of a variety of different substrates at the printer 144, using the film 92a as both a print medium and a portion of the laminate.

While the invention has been described with respect to its preferred embodiments, many other applications of the invention will be apparent to those of skill in the art. For example, I have described the special advantages of my invention for use with self-wound thermally printable labels. However, conventional layer label structures with release liners can also be constructed in accordance with my invention, as well as a broad variety of other direct thermal print media including substrates that are normally not susceptible to direct thermal printing.

Although I prefer to bond a thin film containing the thermosensitive imaging layer to a more substantial substrate using a layer of adhesive, other well-known types of bonding can also be used, including heat or static seals. The various layers, including the layer of thermosensitive imaging material, while preferably continuous, can also be laid down in patterns to suit particular applications.

I claim:

1. A direct thermal printable film for use with a substrate for making a direct thermal printable laminate comprising:
   an optically and thermally transmissive film having front and back surfaces;
   a layer of friction-reducing material applied to said front surface of the transmissive film;
   a layer of thermosensitive imaging material applied to said back surface of the transmissive film;
   said front and back surfaces having respective surface forms and said thermosensitive imaging material taking the form of said back surface of the film;
   said thermosensitive imaging material having a color developing mechanism reactive to transmissions of heat through said film for forming images within said thermosensitive imaging layer that are visible through said film; and
   a layer of adhesive being applied over said layer of thermosensitive imaging material for attaching the film to the substrate prior to printing.

2. The film of claim 1 which said layer of friction-reducing material is a release material for also protecting said layer of adhesive prior to use.

3. The film of claim 2 in which said film is unwindable from a roll in which said layer of adhesive is in contact with said layer of release.

4. The film of claim 1 further comprising a layer of barrier material between said layer of thermosensitive imaging material and said layer of adhesive for preventing migration of contaminants from said layer of adhesive to said layer of thermosensitive imaging material.

5. The film of claim 1 in which said optically and thermally transmissive film has a thickness no greater than 10 microns for transmitting thermal patterns through said film.

6. A method of making a direct thermal printable laminate using a direct thermal printable film comprising:
   an optically and thermally transmissive film having front and back surfaces;
   a layer of friction-reducing material applied to said front surface of the transmissive film;
   a layer of thermosensitive imaging material applied to said back surface of the transmissive film;
   said front and back surfaces having respective surface forms and said thermosensitive imaging material taking the form of said back surface of the film;
   said thermosensitive imaging material having a color developing mechanism reactive to transmissions of heat through said film for forming images within said thermosensitive imaging layer that are visible through said film;
   a layer of adhesive being applied over said layer of thermosensitive imaging material for attaching the film to the substrate prior to printing; and
   including a step of laminating the back surface of the transmissive film containing the layer of thermosensitive imaging material to a front surface of a substrate that does not as readily transmit heat as the transmissive film.

7. The method of claim 6 including the further step of applying a layer of adhesive between the layer of thermosensitive imaging material and the front surface of the substrate prior to said step of laminating.

8. The method of claim 6 including the further step of applying a layer of barrier material over said layer of thermosensitive imaging material prior to said step of laminating.

9. The method of claim 6 including the further step of applying a layer of adhesive to a back surface of said substrate for bonding said substrate to another substrate.

10. The method of claim 9 in which said layer of friction-reducing material is a release material for protecting said layer of adhesive prior to use.

11. The method of claim 10 in which said film and said substrate are unwindable from a common roll in which said layer of adhesive is in contact with said layer of release.

* * * * *